July 19, 1949.    J. E. DOBSON    2,476,847
HOIST HOOK
Filed June 19, 1945

INVENTOR.
John Dobson
BY Archworth Martin
ATTORNEY

Patented July 19, 1949

2,476,847

UNITED STATES PATENT OFFICE 2,476,847

HOIST HOOK

John E. Dobson, Slippery Rock, Pa.

Application June 19, 1945, Serial No. 600,328

5 Claims. (Cl. 24—241)

This invention relates to hoist hooks such as are employed in connection with cranes, derricks, etc., and particularly to that type of hook structure wherein a hook is pivotally supported in a clevis by a pin-and-slot connection whereby, upon vertical movements of the hook in the clevis, the hook can be moved into and out of engagement with a cross bar at the lower end of the hook. In hoist hooks of this form, there is danger that in transporting a load, engagement of the load with an obstruction will cause accidental upward movement of the hook and disengagement thereof from the cross bar at the lower end of the clevis, with consequent danger of injury to workmen, material, or equipment.

The principal object of my invention is to provide a safety device which is readily manipulated, to positively hold the hook in its load-supporting position in the clevis, but which is movable to release the hook for movement thereof to a load-releasing position.

Another object of my invention is to provide a safety device of the character referred to which, while it is easily manipulated, will not become accidentally moved to a release position, with means thereon for clearly showing to a casual observer whether the safety device is in its operative position or in its inoperative position.

Figure 1:
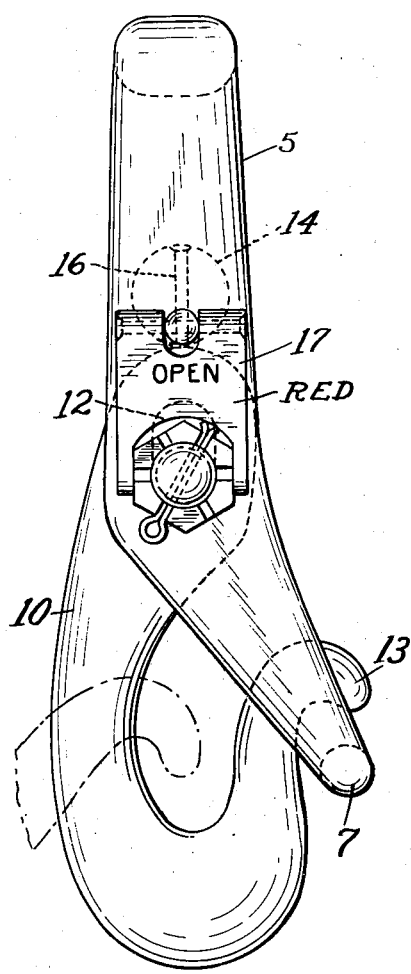
Figure 2:
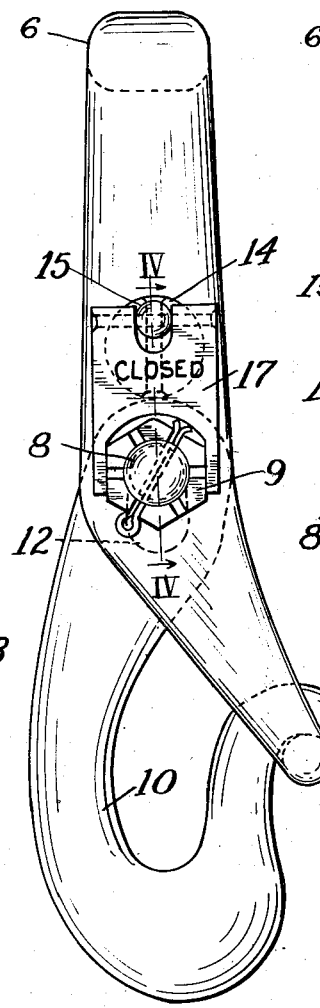
Figure 3:
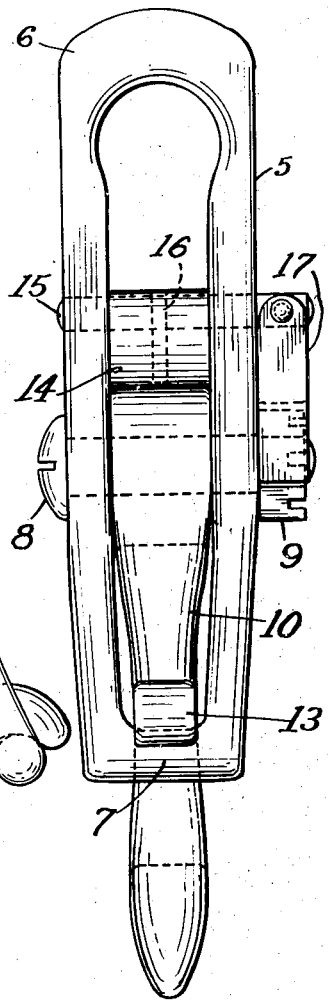
Figure 4:
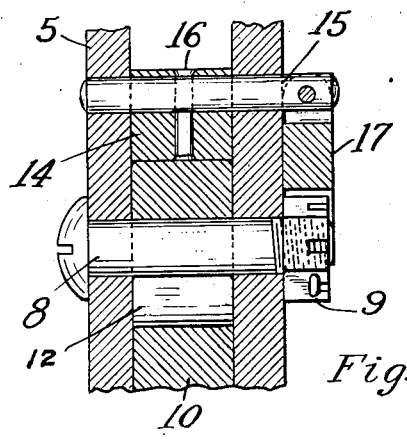

As shown in the accompanying drawing, Figure 1 is a side view of a hoist hook structure showing the safety device in its inoperative position; Fig. 2 is a view showing the safety device in position for holding the hook in load-supporting position in the clevis; Fig. 3 is an edge view of the structure of Fig. 2, and Fig. 4 is a sectional view taken on the line IV—IV of Fig. 2.

The hook structure comprises a clevis 5 having a bail portion 6 for connection to a crane, derrick, or the like, and having a cross bar portion 7 at its lower end. A pivot pin or bolt 8 extends through the legs of the clevis and has a nut 9 on one end thereof. A hook 10 is positioned between the legs of the clevis and has an elongated hole or slot 12 through which the bole 8 extends. The hook, when not held by the safety device, is movable vertically and pivotally relative to the pin 8, to permit of the lip 13 of the hook being moved out of seating engagement with the cross bar 7, to the dash-line position shown in Fig. 1.

A detent 14 of cam-like form is supported between the legs of the clevis by a shaft 15 which extends through the cam member and is rigidly secured thereto by a tightly driven stud or rivet 16.

When the shaft 15 is rotated to move the detent 14 to the position shown in Fig. 1, the hook 10 may be raised to disengage its lip 13 from the cross bar 7 and the hook can then be swung clockwise for disengagement of a load therefrom. On the other hand when the detent 14 is in the position shown in Figs. 2, 3 and 4, it will rigidly hold the hook in its lowermost position, with the lip seated on the cross bar.

The detent 14 and its shaft are rotated by a handle or lever 17 which is pivotally connected to one end of the shaft and is of yoke-like form near its lower end, to straddle the nut 9 when in its lowermost position. When the lower end of the lever 17 is swung clear of the nut, it can be turned about the axis of the pin 15 to rotate the detent, while, when it is in its lowermost position, it will straddle the nut 9 and it, together with the detent 14, will be held against accidental rotation about the axis of the shaft 15. The lever 17, therefore, also serves as a latch to hold the detent in operative position. If through swinging movement of the clevis, the lever 17 tilts clear of the nut, it will still hang in a substantially vertical position and the detent 14 will tend to remain in its operative or hook-retaining position. The lever will also serve as a latch to hold the detent in release position, to thereby permit convenient manipulation of the hook.

When the detent is in the position of Figs. 2, 3 and 4, the side of the lever which is exposed will have the legend "closed" visible thereon and that side may also be painted green to show that the detent is in its safety position. When the positions of the parts 14—17 are as shown in Fig. 1, the opposite face of the lever 17 will be exposed to view, with the legend "opened" thereon and that face of the lever may suitably be painted red to show that the detent is in its open or danger position.

I claim as my invention:

1. A hoist hook structure comprising a clevis having a hook-engaging bar at its lower end, a pivot pin mounted in the clevis, a hook having a vertically elongated slot near its upper end, through which the pivot pin extends, and having a down-turned lip that will rest upon the bar, when the hook is in its lower position, the hook being movable vertically relative to the pin and the bar, a cam-shaped detent rotatably mounted in the clevis, on an axis above and parallel to the pivot pin, and engageable with the upper end of the hook, to hold the lip seated on the said bar, at one rotative position, and which at another rotative position will leave sufficient clearance for upward movement of the hook and its lip to clear the bar, a handle pivotally connected to the detent, on an axis transverse to the axis of the detent, the handle being non-rotatable relative to the detent, about the axis of the detent, and a stop member releasably engaged by the handle, at one side of the clevis, to hold the detent against rotative movements.

2. A hoist hook structure comprising a clevis having a hook-engaging bar at its lower end, a pivot pin mounted in the clevis, a hook having a vertically elongated slot near its upper end, through which the pivot pin extends, and having a down-turned lip that will rest upon the bar, when the hook is in its lower position, the hook being movable vertically relative to the pin and the bar, a cam-shaped detent rotatably mounted in the clevis, on an axis above and parallel to the pivot pin, and engageable with the upper end of the hook, to hold the lip seated on the said bar, at one rotative position, and which at another rotative position will leave sufficient clearance for upward movement of the hook and its lip to clear the bar, a handle pivotally connected to the detent, on an axis transverse to the axis of the detent, the handle being non-rotatable relative to the detent, about the axis of the detent, and a stop member releasably engaged by the handle, at one side of the clevis, to hold the detent against rotative movements, the handle being movable, by pivotal motion against the side of the clevis, when the detent is in either its holding or its release position.

3. A hoist hook structure comprising a clevis having a hook-engaging bar at its lower end, a pivot pin mounted in the clevis, a hook having a vertically elongated slot near its upper end, through which the pivot pin extends, and having a down-turned lip that will rest upon the bar, when the hook is in its lower position, the hook being movable vertically relative to the pin and the bar, a cam-shaped detent rotatably mounted in the clevis, on an axis above and parallel to the pivot pin, and engageable with the upper end of the hook, to hold the lip seated on the said bar, at one rotative position, and which at another rotative position will leave sufficient clearance for upward movement of the hook and its lip to clear the bar, a handle pivotally connected to the detent, on an axis transverse to the axis of the detent, the handle being non-rotatable relative to the detent, about the axis of the detent, and means for releasably latching the handle at one side of the clevis, to hold the detent against rotative movements, the said latching means comprising an opening in the free end of the handle, in position to receive a projection at the side of the clevis when the handle is swung against the side of the clevis.

4. A hoist hook structure comprising a clevis having a hook-engaging bar at its lower end, a pivot pin mounted in the clevis, a hook having a vertically elongated slot near its upper end, through which the pivot pin extends, and having a down-turned lip that will rest upon the bar, when the hook is in its lower position, the hook being movable vertically relative to the pin and the bar, a cam-shaped detent rotatably mounted in the clevis, on an axis above and parallel to the pivot pin, and engageable with the upper end of the hook, to hold the lip seated on the said bar, at one rotative position, and which at another rotative position will leave sufficient clearance for upward movement of the hook and its lip to clear the bar, a handle pivotally connected to the detent, on an axis transverse to the axis of the detent, the handle being non-rotatable relative to the detent, about the axis of the detent, and a stop member releasably engaged by the handle at one side of the clevis, to hold the detent against rotative movement, the lever being movable, by pivotal motion against the side of the clevis, and in a depending position relative to the detent, when the detent is in either its holding or its release position.

5. A hoist hook structure comprising a clevis having a hook-engaging bar at its lower end, a pivot pin mounted in the clevis, a hook having a vertically elongated slot near its upper end, through which the pivot pin extends, and having a down-turned lip that will rest upon the bar, when the hook is in its lower position, the hook being movable vertically relative to the pin and the bar, a detent mounted within the clevis and movable into position to hold the lip seated on the bar, a lever at an outer side of the clevis for moving the detent to and from its hook-holding position, and means for releasably retaining the lever at the location it occupies when the detent is in its holding position.

JOHN E. DOBSON.

REFERENCES CITED

The following references are of record in the file of this patent:

UNITED STATES PATENTS

| Number | Name | Date |
|---|---|---|
| 462,465 | Berry | Nov. 3, 1891 |
| 700,581 | Towner | May 20, 1902 |
| 1,071,650 | O'Kelly | Aug. 26, 1913 |
| 1,449,364 | McGowan | Mar. 20, 1923 |
| 2,359,557 | Hoffman | Oct. 3, 1944 |